(No Model.) 2 Sheets—Sheet 1.
E. A. BAGBY.
OINTMENT APPLICATOR.
No. 596,351. Patented Dec. 28, 1897.
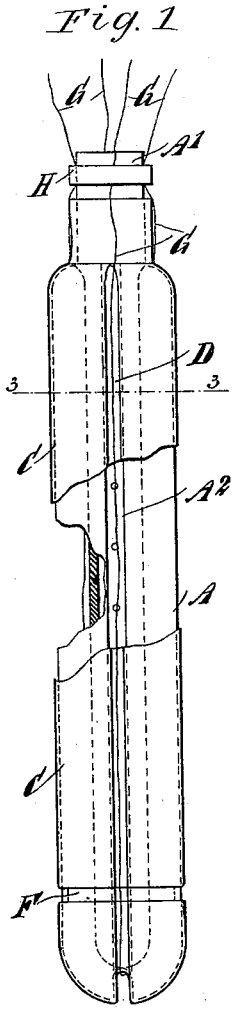
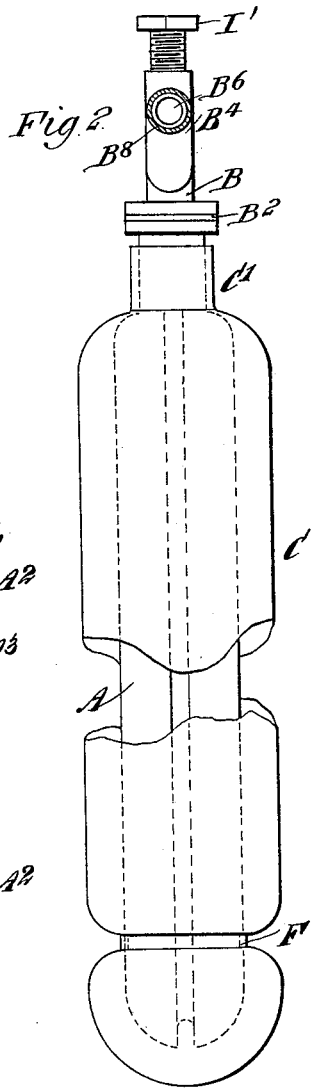
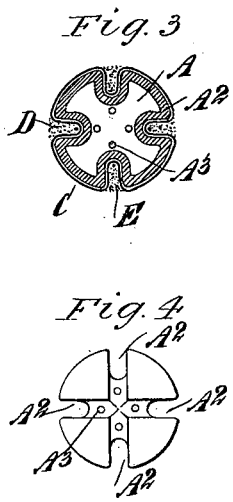
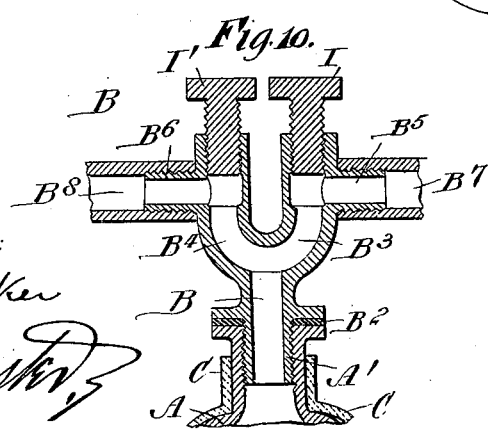
WITNESSES:
J. B. Walker
Rev. G. Hosler
INVENTOR
E. A. Bagby
BY
ATTORNEYS (No Model.) 2 Sheets—Sheet 2.
E. A. BAGBY.
OINTMENT APPLICATOR.
No. 596,351. Patented Dec. 28, 1897.
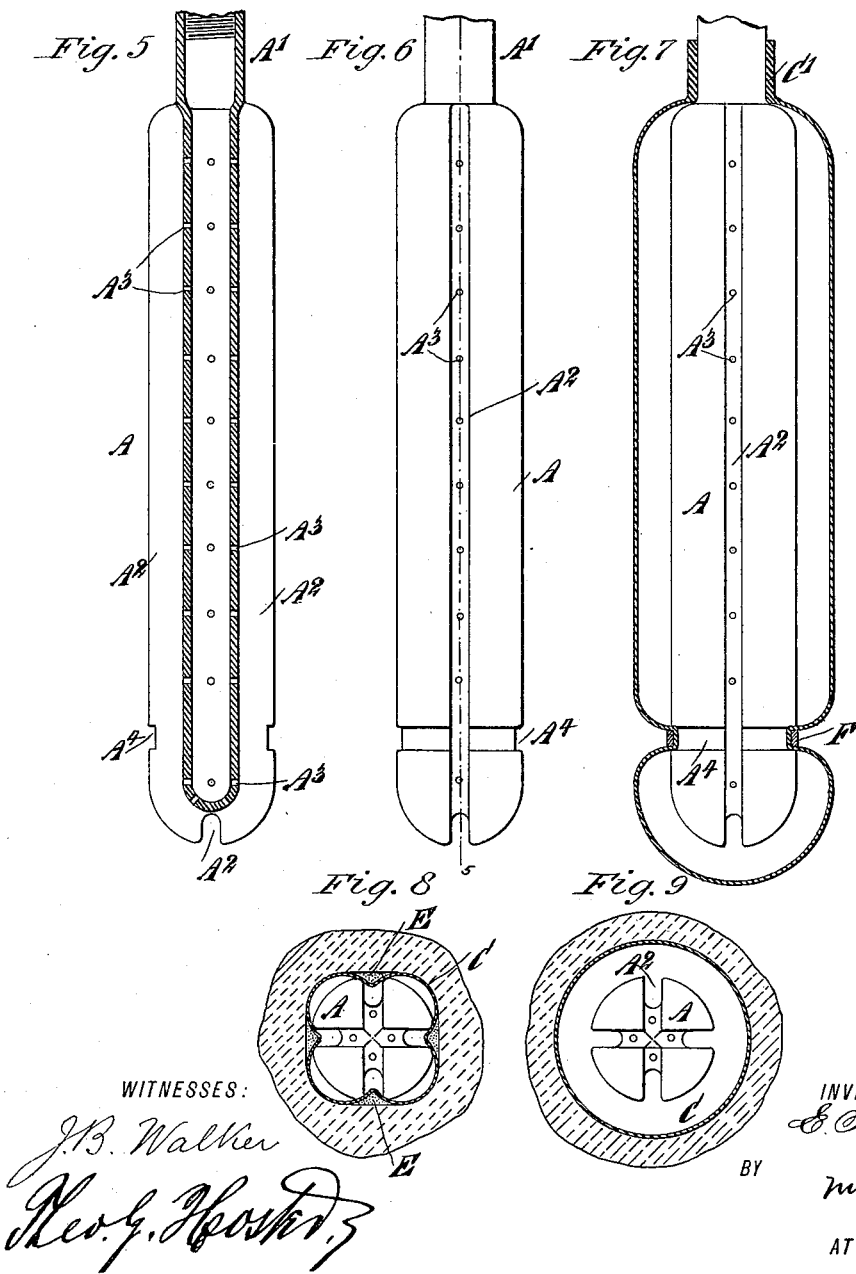
WITNESSES:
J. B. Walker
Geo. G. Hosters
INVENTOR
E. A. Bagby
BY
ATTORNEYS

UNITED STATES PATENT OFFICE.

EUGENE A. BAGBY, OF WINCHESTER, KENTUCKY.

OINTMENT-APPLICATOR.

SPECIFICATION forming part of Letters Patent No. 596,351, dated December 28, 1897.

Application filed April 11, 1896. Serial No. 587,201. (No model.)

*To all whom it may concern:*

Be it known that I, EUGENE A. BAGBY, of Winchester, in the county of Clark and State of Kentucky, have invented a new and Improved Ointment-Pipe, of which the following is a full, clear, and exact description.

The invention relates to vaginal syringes; and its object is to provide a new and improved ointment-pipe for conveniently and thoroughly applying pastes, oils, ointments, &c., to the wall of the vaginal canal or other orifice in the human body.

The invention consists principally of a pipe having external grooves and a flexible sheath fitted over said pipe and extending into said grooves to form receptacles for the substance, the latter being applied to the lining membrane of the canal or cavity upon inflating said sheath.

The invention further consists of an inflatable flexible sheath adapted to carry exteriorly the substance to be applied.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the views.

Figure 1 is a side elevation of the improvement with parts broken out. Fig. 2 is a like view of the same with the sheath expanded. Fig. 3 is a cross-section of the improvement on the line 3 3 of Fig. 1. Fig. 4 is an end view of the pipe. Fig. 5 is a sectional side elevation of the pipe. Fig. 6 is a side elevation of the same. Fig. 7 is a sectional side elevation of the inflated sheath and the pipe therein in elevation. Fig. 8 is a cross-section of the partially-inflated sheath as applied and with the end of the pipe in elevation. Fig. 9 is a like view of the same with the sheath fully inflated, and Fig. 10 is a side elevation of the inlet and outlet device for the pipe.

The improved device is provided with a pipe A of suitable length and diameter and formed at one end with a neck A', adapted to be connected with an air or water supply device B, connected with an air bulb or syringe for forcing the air or water into said pipe A.

The outer closed end of the pipe A is rounded off, as indicated in the drawings, and on said pipe are formed exterior longitudinally-extending grooves $A^2$, passing around the outer end of the pipe and formed in their bottoms with apertures $A^3$, leading to the inside of the pipe, so that the air or water forced therein can issue through said apertures, for the purpose hereinafter more fully described.

Onto the pipe A is fitted a flexible inflatable sheath C, made of rubber or like elastic material and formed at its open end with a neck C', fitting snugly upon the neck A' of the pipe A. The sheath fits into the longitudinal grooves $A^2$, as plainly indicated in Figs. 1 and 3, so as to form exterior pockets D, adapted to be filled with the substance E to be applied.

Now in order to hold the sheath C in position on the pipe A, I provide a rubber band F, passed over the sheath near its outer end, so as to press the said sheath into an annular groove $A^4$, formed on the pipe A. In order to form and maintain the pockets D previous to filling the same with the substance to be applied, I employ strings or cords G, drawn tightly through the bottoms of the pockets formed in the sheath, said strings being held in place by a rubber ring H, applied to the neck A' of the tube. (See Fig. 1.)

The device B for filling and emptying the pipe A to inflate and deflate the sheath C is shown in detail in Fig. 10, and consists of a pipe B', screwing into the neck A' against a washer $B^2$ for forming a tight joint. The outer end of the pipe B', divided into the branch pipes $B^3$ and $B^4$ is having nipples $B^5$ and $B^6$, respectively, connected with the inlet-tube $B^7$ and the discharge-tube $B^8$, respectively. The inlet-tube $B^7$ is connected with a suitable source of air, water, or other fluid supply, usually an air bulb or syringe, to force the fluid through the tube $B^7$, nipple $B^5$, branch pipe $B^3$, and pipe B' into the pipe A to inflate the sheath C. Valves I I' screw in the outer ends of the branch pipes $B^3$ and $B^4$, respectively, to open or close the same to the nipples $B^5$ and $B^6$, respectively. Previous to applying the device both valves I I' are closed, and after the device is inserted the valve I is opened and water or air forced into the tube A to inflate the sheath C. When this has been done, the valve I is closed and the tube B⁷ can be removed. When it is desired to deflate the sheath, the valve I' is opened to permit the air or water to escape by way of branch pipe B⁴, nipple B⁶, and tube B⁸, discharging into a suitable receptacle, if a liquid is used for inflating.

The device is used as follows: When the sheath C is in position on the pipe A and the pockets D are formed by drawing the strings G taut, the said pockets are filled with the substance to be applied and then the instrument is inserted in the canal or cavity, after which the strings or cords H are pulled out. Air or water is now forced into the pipe A by an air bulb or syringe, as previously explained, and the air or water in passing through the apertures A³ presses on the sheath C at the pockets, so as to force said pockets outward and the substance E in contact with the surface of the membrane. The operator now turns the instrument so as to bring the substance in contact with the entire surface of the membrane, it being understood that the air or water forced into the pipe A and through the apertures A³ thereof finally expands the sheath C to its full extent, as indicated in Figs. 7 and 9. The gradually-expanding sheath dilates the membrane and opens its folds, so that on turning the instrument the ointment is brought in contact with the entire surface portion of the opened-up membrane. It is understood that the inflated yielding sheath distributes the ointment evenly and thoroughly as the pipe is turned without danger of rupture or abrasion of the membrane and with the least possible discomfort to the patient. In order to remove the instrument, the operator first deflates the sheath C by permitting the air or liquid to escape by way of the device B, as previously explained. The instrument can then be withdrawn without injury to the patient.

By the arrangement described I am enabled to subject the affected parts to a continuous application of heat or cold by giving the desired temperature to the fluid previous to passing it into the pipe A.

It is further understood that the grooves A² are of a suitable depth and continue around the closed end of the pipe, so that two, four, or six such grooves are formed, each double groove forming a continuous pocket held in place by a cord or string, as will be readily understood by reference to Fig. 1.

Having thus fully described my invention, I claim as new and desire to secure by Letters Patent—

1. A device of the class described, comprising a cylindrical body provided with external cavities, and a flexible inflatable sheath on the body and extending into the cavities thereof to form pockets for the reception of the substance to be applied, whereby when the sheath is inflated the pockets will be forced outward and the contents thereof applied to the parts to be treated, substantially as described.

2. A device of the class described, comprising a pipe having external grooves, and a flexible sheath fitted over said pipe and extending into said grooves, to form receptacles for the substance to be applied, the latter being applied to the surface of the membrane of the canal or cavity, upon inflating the sheath, substantially as shown and described.

3. A device of the class described, comprising a cylindrical hollow body apertured and provided with external cavities, said body being constructed to be connected with an air or water supply, and a flexible sheath on the body and extending into the cavities thereof to form pockets for the reception of the substance to be applied, whereby the sheath can be inflated to apply the contents of its pockets to the parts to be treated, substantially as described.

4. A device of the class described, comprising a pipe closed at one end and adapted to be connected at its other end with an air or water supply, said pipe being formed with longitudinally-extending grooves connected with the interior of the pipe by apertures, and a flexible sheath fitted over said pipe and extending into said grooves to form pockets for the substance to be applied, the latter being forced outward against the surface of the membrane of the canal or cavity, by inflating the sheath and turning the instrument, substantially as shown and described.

5. A device of the class described, comprising a pipe closed at one end, and adapted to be connected at its other end with an air or water supply, said pipe being formed with longitudinally-extending grooves connected with the interior of the pipe by apertures, a flexible sheath fitted over said pipe and extending into said grooves to form pockets for the substance to be applied, the latter being forced outward against the surface of the membrane of the canal or cavity, by inflating the sheath and turning the instrument, and cords or strings engaging said sheath at the bottom of the pockets, substantially as shown and described.

6. In a device of the class described, a pipe closed at one end and provided with longitudinal grooves extending around the closed end, and with apertures in the bottoms of the said grooves, substantially as described.

7. In a device of the class described, a pipe closed at one end and provided with longitudinal grooves extending around the closed end, apertures in the bottoms of the grooves, and an annular groove adjacent to its closed end, substantially as described.

8. A device of the class described, comprising an apertured pipe closed at one end and provided with longitudinal grooves extending around the closed end, a flexible inflatable sheath on the pipe, and cords or strings for holding the sheath in the grooves of the pipe to form pockets for the reception of the substance to be applied, substantially as described.

9. A device of the class described, comprising a pipe closed at one end, and adapted to be connected at its other end with an air or water supply, said pipe being formed with longitudinally-extending grooves passing around the closed end and connected with the interior of the pipe by apertures, a flexible sheath fitted over said pipe and extending into said grooves to form pockets for the substance to be applied, the latter being forced outward against the surface of the membrane of the canal or cavity, by inflating the sheath and turning the instrument, cords or strings engaging said sheath at the bottom of the pockets, and a rubber band for holding said strings or cords in place on the neck of said pipe, substantially as shown and described.

10. A device of the class described, comprising a perforated pipe closed at one end and provided at its other with a neck, a sheath held on the said pipe and adapted to be inflated and deflated, and a device, substantially as described, and connected with the said neck, the device being arranged to pass a fluid into the said pipe to inflate the sheath, to retain the fluid in the pipe for a suitable length of time and to discharge the fluid, to deflate the sheath when desired, substantially as shown and described.

EUGENE A. BAGBY.

Witnesses:
A. M. KING,
W. P. WINN.